May 12, 1925.
L. R. HIBBS
1,537,824
CUCUMBER PICKING APPARATUS
Filed Dec. 29, 1923
2 Sheets-Sheet 1
Fig. 1.
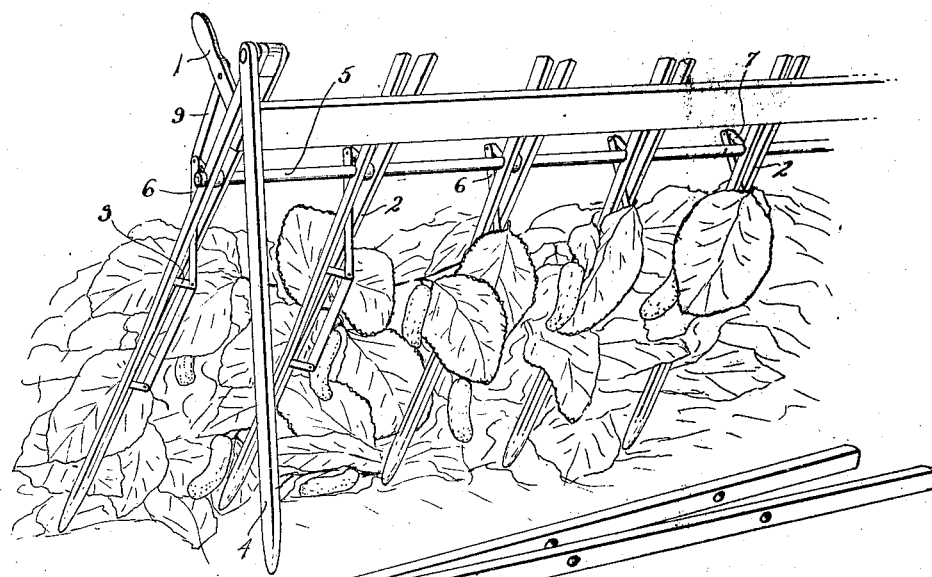
Fig. 6.
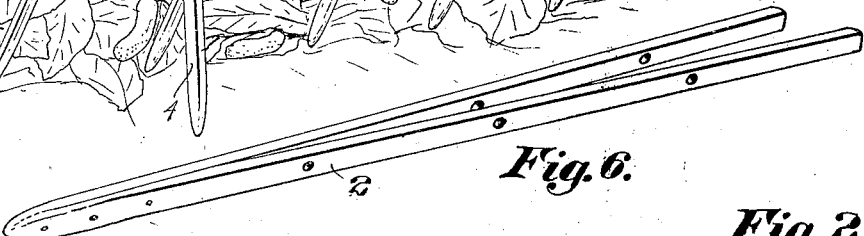
Fig. 2.
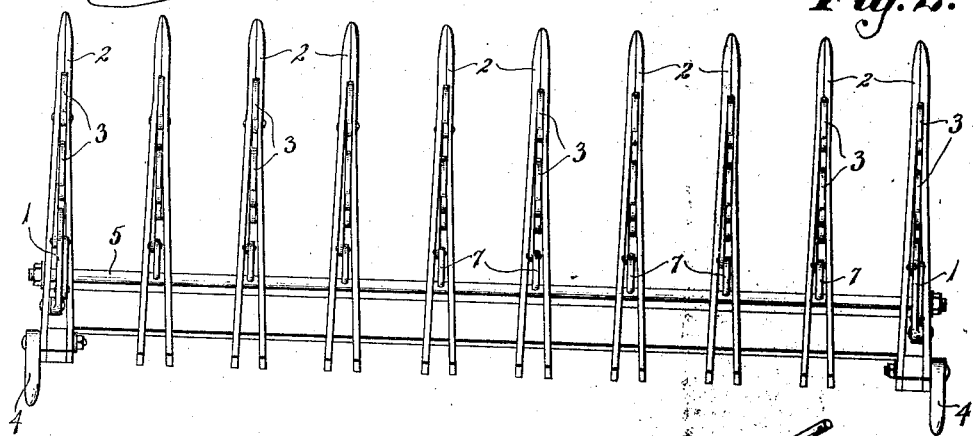
Fig. 7.
L. R. Hibbs.
INVENTOR
BY Victor J. Evans,
ATTORNEY
WITNESS:

May 12, 1925. 1,537,824
L. R. HIBBS
CUCUMBER PICKING APPARATUS
Filed Dec. 29, 1923 2 Sheets-Sheet 2
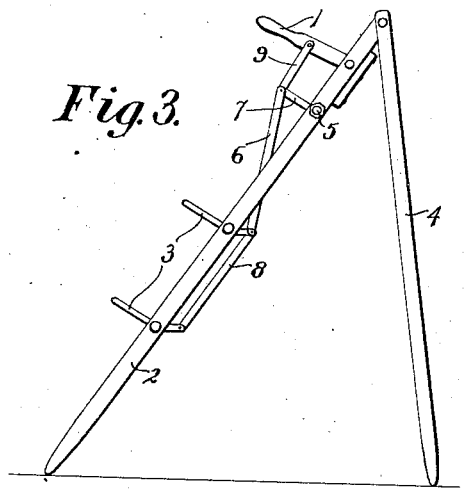
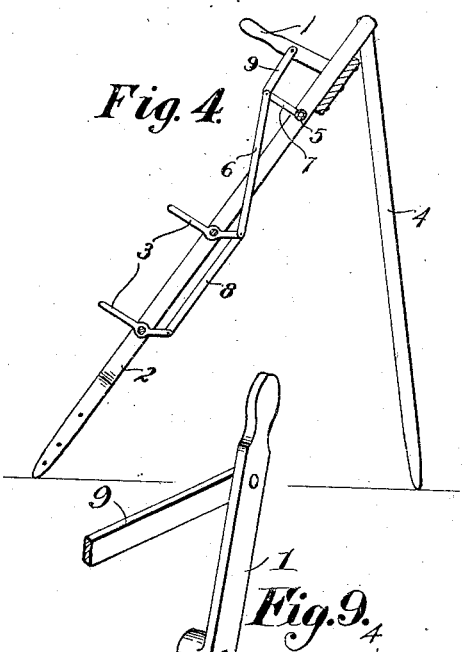
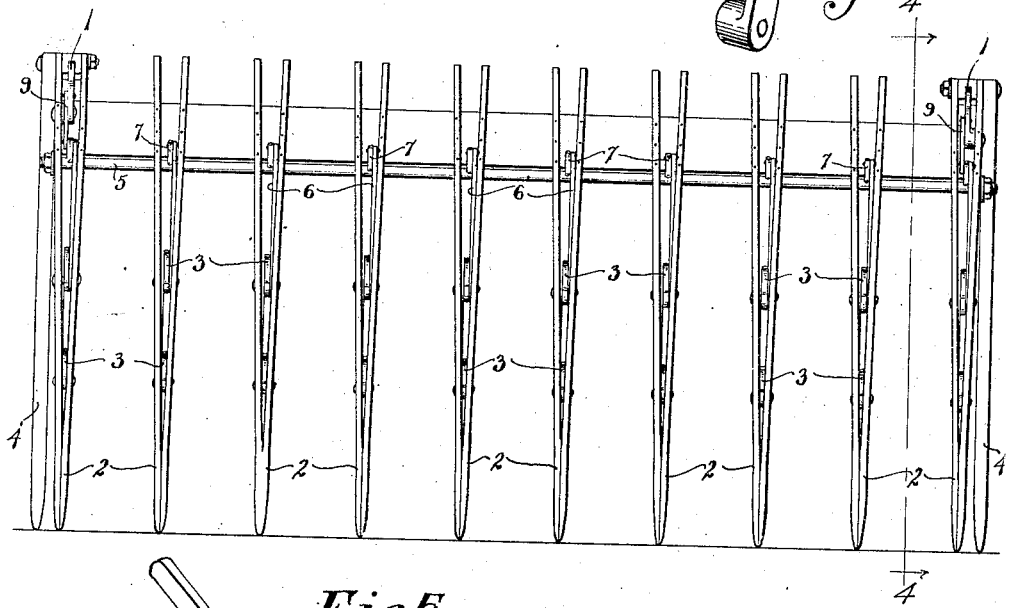
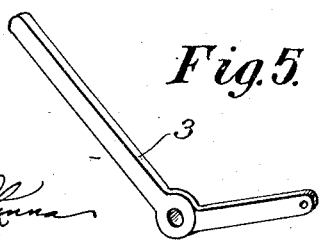
L. R. Hibbs.
INVENTOR
BY Victor J. Evans.
ATTORNEY Patented May 12, 1925.

1,537,824

UNITED STATES PATENT OFFICE.

LEONIDAS R. HIBBS, OF WAPATO, WASHINGTON.

CUCUMBER-PICKING APPARATUS.

Application filed December 29, 1923. Serial No. 683,445.

*To all whom it may concern:*

Be it known that I, LEONIDAS R. HIBBS, a citizen of the United States, residing at Wapato, in the county of Yakima and State of Washington, have invented new and useful Improvements in Cucumber-Picking Apparatus, of which the following is a specification.

The object of my said invention is the provision of an apparatus for quickly and efficiently picking cucumbers with the imposition of a minimum amount of labor on the operator or operators of the apparatus and without subjecting the cucumber vines to undue injury.

To the attainment of the foregoing, the invention consists in the improvement as hereinafter described and definitely claimed.

In the accompanying drawings, forming part of this specification:—

Figure 1 is a general view illustrating the arrangement of the apparatus constituting the preferred embodiment of my invention relative to vines in a field from which cucumbers are to be picked through the medium of the apparatus incident to the operation of the latter.

Figure 2 is a plan view of the apparatus as it appears in use.

Figure 3 is an elevation of one end of the apparatus.

Figure 4 is a cross-section on the line 4—4 of Figure 5.

Figure 5 is a front elevation of the apparatus.

Figure 6 is a perspective of one of the fingers.

Figure 7 is a perspective of the rock shaft.

Figure 8 is a perspective of one of the teeth.

Figure 9 is a perspective showing one hand lever and the connection thereon.

Similar numerals designate corresponding parts in all of the views of the drawings.

The apparatus illustrated is designed to be worked by two operators, one at each end of the apparatus. I do not desire, however, to be understood as confining myself to an apparatus for two men operation inasmuch as it is within the purview of my invention to embody the principle thereof in an apparatus constructed and arranged and of such size for the adequate operation of the apparatus by a single man.

Among other elements the apparatus illustrated comprises two hand levers 1, one at each end of the apparatus which is about ten feet in length. The apparatus also comprises a plurality of upright fingers 2, arranged in parallelism throughout the length of the apparatus, and it will also be understood that in conjunction with each finger 2 I employ two teeth 3. At each end of the apparatus I employ legs 4, the construction being such, as illustrated, that in use the legs 4 will rest at an acute angle to the transverse series of fingers 2. The apparatus further comprises a rock shaft 5 which extends throughout the length of the apparatus, and connections 6 between cranks 7 on the said rock shaft and the teeth 3 of each finger 2, supplemental connections 8 being employed as illustrated when each finger 2 is provided with more than one tooth 3. Connections 9 are interposed between and connected to the end cranks 7 or other cranks on the shaft 5 and the levers 1 so that rocking of the shaft 5 about its axis will attend manual swinging of the levers 1. The fingers 2 and the legs 4 are made tapered and rounded at the points so as to enable them to slip easily under vines without the infliction of injury on the vines, and it will also be noted that the legs 4 are adapted when the apparatus is pulled backwardly to close up alongside of the fingers 2.

In the practical operation of the apparatus as described, men at the ends of the apparatus slide the apparatus under vines and manipulate the levers 1 to raise the teeth 3 which will result in the teeth holding the vines against slipping ahead. Manifestly when the vines are trained in one direction the cucumbers are almost all inside and by the manipulation of the teeth 3 through the medium of the levers 1 and the connections described the cucumbers during the movement and manipulation of the apparatus may be expeditiously and easily picked with but little effort on the part of the operators. It will also be observed that when the apparatus is placed relative to a group of vines and is maintained in such position by the legs 4 in cooperation with the plurality of the fingers 2, the apparatus can be worked to advantage for the picking of the cucumbers from the said group of vines, and may then be moved to another location; it being understood in this connection that the apparatus as a whole is very light in weight and can therefore be easily moved from one location to another by the two workmen alluded to.

It will be apparent from the foregoing that my novel apparatus notwithstanding its efficiency as pointed out in the foregoing is simple and inexpensive in construction and is strong and durable.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. An apparatus for facilitating the picking of cucumbers comprising a plurality of spaced upright fingers, teeth on the fingers and movable relative thereto, a handle, and a connection between the handle and the several teeth whereby movement of the handle will be attended by the movement of teeth relative to their respective fingers.

2. An apparatus for facilitating the picking of cucumbers comprising a plurality of spaced upright fingers, teeth on the fingers and movable relative thereto, a handle, and a connection between the handle and the several teeth whereby movement of the handle will be attended by the movement of teeth relative to their respective fingers; the handle being in the form of a manually-operable lever, and the connections between the handle and the teeth includes a crank shaft and means interposed between the handle and the crank shaft and other means interposed between the crank shaft and the teeth.

3. An apparatus for facilitating the picking of cucumbers comprising a plurality of spaced upright fingers, teeth carried by and movable relative to the fingers, legs hingedly connected with the plurality of fingers and arranged at the ends of the series of fingers, a rock shaft connected with the series of fingers and having cranks, connections between said cranks and said teeth, and a hand lever for rocking the said shaft.

In testimony whereof I affix my signature.

LEONIDAS R. HIBBS.